Figure 1:
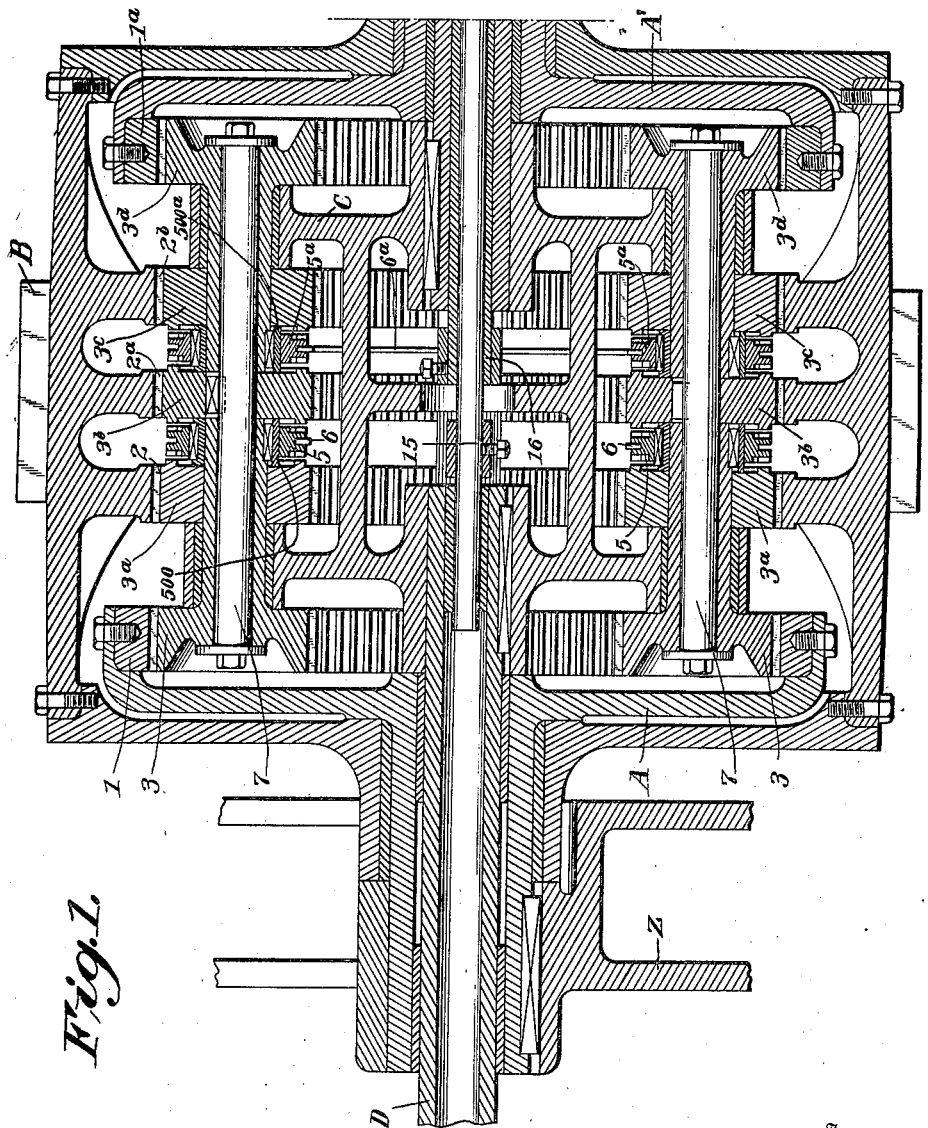

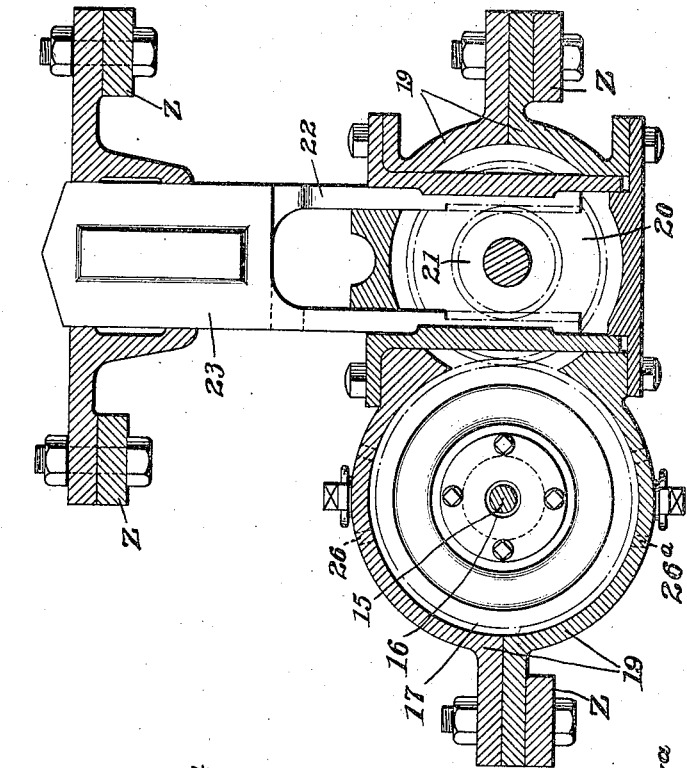
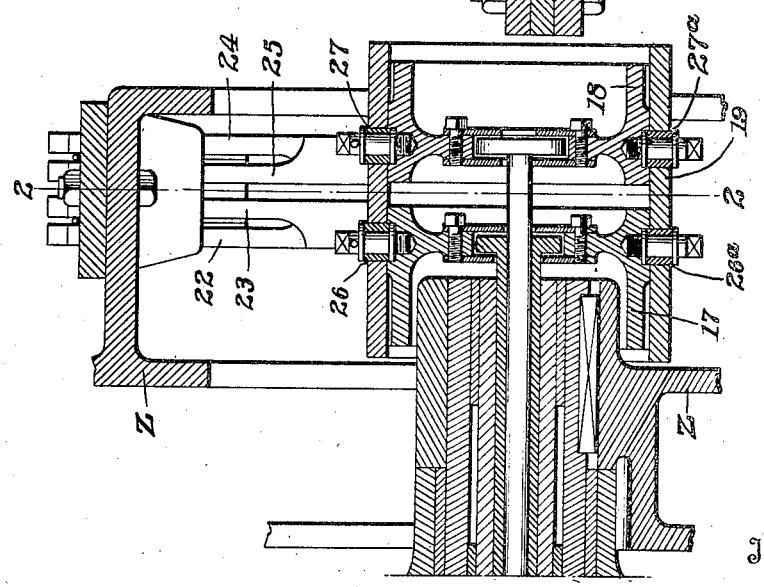

Patented July 24, 1923.

1,462,951

UNITED STATES PATENT OFFICE.

EMILE JOHN WELFFENS, OF MANCHESTER, ENGLAND.

PLANETARY GEARING.

Original application filed July 3, 1922, Serial No. 572,705. Divided and this application filed March 27, 1923. Serial No. 628,124.

*To all whom it may concern:*

Be it known that I, EMILE JOHN WELFFENS, a subject of the King of the Belgians, residing at Manchester, England, have invented new and useful Improvements in Planetary Gearing, of which the following is a specification.

The invention relates to planetary gearing and is a division of an application filed by me July 3, 1922, Serial No. 572,705.

The object of the present invention is to improve the construction of planetary gearing and to provide constructions adapted to afford slow precessional or recessive movement to a driven member with high peripheral operating speeds of driving members besides virtually equal paths or curves for the rolling driving members, virtual as well as actual staggering of wheel and pinion teeth, constricted execution and relative continuity of motion.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings, in which like characters of reference designate corresponding parts in the several views:—

Figure 1 is a longitudinal sectional view of a planetary gearing, constructed in accordance with this invention and shown applied to a planing machine, Figure 2 is a transverse sectional view on the line 2—2 of Figure 1.

In the accompanying drawings is illustrated the preferred embodiments of the invention.

Referring to Figures 1 and 2 in which the hypocyclic action speed reducing, reversing and variable speed planetary gearing is shown applied to a planing machine, the entire construction is housed in a composite wheel B, which is adapted to afford a grease or oil bath and which is in the form of a hollow drum composed of peripheral and end sections. 1 and 1ª designate stationary orbit wheels secured to bushings A and A' fixed to the bed Z of the machine and serving as bearings for a driving shaft D and the said wheel B. 2, 2ª and 2ᵇ are driven ring gears formed integral with the wheel B. All the ring gears which are arranged interiorly of the peripheral section of the wheel B mesh with two sets of quintuple driving pinions 3, 3ª, 3ᵇ and 3ᶜ and 3ᵈ spaced 120 degrees and all except the pinion 3ᵇ being revoluble upon a consolidating spindle 7 which nests the pinion in position and in alignment. The pinions are arranged in two sets or nests and the two nests of pinions are revolubly housed in a cage C keyed to the shaft D. With the shaft D running at the constant speed in one direction, speed reduction, slow, medium and quick speed forward and accelerated return obtains with wheels having the following number of teeth, wheel 1—244, wheel 1ª—236, wheel 2—242, wheel 2ª—240 and wheel 2ᵇ—235, and the pinions may have any equal number of teeth. The pinions 3ª and 3ᶜ have clutch teeth on one of their faces, while the pinion 3ᵇ is provided on both of its faces with clutch teeth. Clutches 5 and 5ª are slidably keyed to distance or spacing rings 500 and 500ª, which, in turn, are fixedly keyed to pinions 3 and 3ᵈ and the said clutches are moved by forks 6 and 6ª fixed to rod 15 and bushing 16 respectively. The rod 15 is arranged within the bushing or sleeve 16 and both of these members extend into the driving shaft D and project therefrom at one end of the same. The operating members 15 and 16 are revolubly connected to pistons 17 and 18, each of which carry a pair of studs and guide blocks movable in cam like slots 26, 26ª, 27 and 27ª provided in a split cylinder 19 fixed to the bed Z, as clearly illustrated in Figure 2 of the drawings.

Each piston is rotated backwardly and forwardly and consequently displaced through guidance in the cam-like slots by means of two racks; piston 17 by means of racks 22 and 23 and piston 18 by means of racks 24 and 25. Each pair of racks meshes in diametrically opposite positions with the pinion 21 or 21ª, each pinion being integral with a spur wheel 20 or 20ª. The pinion 21 and wheel 20 are illustrated in Figure 2 as controlling the rotation of piston 17, since spur wheel 20 meshes with the teeth on the periphery of the piston 17. The other spur wheel 20ª meshes with the teeth on the piston 18.

The mechanism is ilustrated in neutral position and in practice the racks 22, 23, 24 and 25 will be operated by suitable stops provided on the table of the machine and it will be obvious that by suitably fixing such stops the desired speed may be obtained. The pitch circle diameters of the sun wheels closely aproximate one another and so do the peripheral speeds and as the driving power is applied at high speed close to the circumferences of the wheel B, power transmission is obtained with a unit of very constricted design and good mechanical efficiency. The hollow drum which consists of the wheel B and which houses the mechanism, is shown provided at its center with external spur teeth.

What is claimed is:

1. Planetary gearing comprising a stationary wheel, a drive shaft, a rotary element mounted on the drive shaft, a planetary pinion meshing with the stationary wheel and having a spindle mounted on the rotary element, spaced planetary pinions carried by the spindle, a wheel housing the said parts and having gear elements meshing with the pinions of the spindle, and planetary clutch mechanism for connecting the pinions of the spindle with the first mentioned pinion.

2. Planetary gearing comprising a stationary wheel, a drive shaft, a rotary element mounted on the drive shaft, a planetary pinion meshing with the stationary wheel and having a spindle mounted on the rotary element, spaced planetary pinions carried by the spindle, a wheel consisting of a hollow drum housing the said elements and adapted to contain a lubricant and provided with interior gear elements meshing with the pinions of the spindle, and planetary clutch mechanism for engaging the pinions of the spindle to connect them with the first mentioned pinion.

3. Planetary gearing comprising a stationary wheel, a drive shaft, a rotary element mounted on the drive shaft, a planetary pinion meshing with the stationary wheel and having a spindle mounted on the rotary element, spaced planetary pinions carried by the said spindle, a wheel consisting of a hollow drum provided with external spur teeth and having internal ring gears meshing with the pinions of the spindle, and planetary clutch mechanism for engaging the pinions of the spindle to connect them with the first mentioned pinion.

4. Planetary gearing comprising a shaft, stationary orbit wheels spaced apart and arranged on the said shaft, a rotary element mounted on the shaft, planetary pinions meshing with the orbit wheels and having hollow spindles mounted on the rotary element, a rod passing through the hollow spindles and connecting the planetary pinions, spaced planetary pinions loose on the spindles, clutch mechanism operating between the loose pinions for connecting the same with the spindles, and gear elements meshing with the clutch controlled pinions.

5. Planetary gearing comprising a shaft, stationary orbit wheels spaced apart and arranged on the said shaft, a rotary element mounted on the shaft, planetary pinions meshing with the orbit wheels and having hollow spindles mounted on the rotary element, a rod passing through the hollow spindles and connecting the planetary pinions, spaced planetary pinions loose on the spindles, clutch mechanism operating between the loose pinions for connecting the same with the spindles, and a hollow drum housing the said parts and provided with interiorly arranged gear elements meshing with the clutch controlled pinions.

6. Planetary gearing comprising a shaft, stationary orbit wheels spaced apart and arranged on the shaft, a rotary element mounted on the shaft between the said wheels, planetary pinions meshing with the orbit wheels and having hollow spindles mounted on the rotary element, a rod passing through the spindles and connecting the said pinions, a plurality of loose planetary pinions spaced apart and mounted on the said spindles and on the said rod, clutch mechanism operating between the loose pinions for connecting the same with the spindles, and gear elements meshing with the clutch controlled pinions.

7. Planetary gearing comprising a hollow driving shaft, a stationary orbit wheel arranged thereon, a rotary element mounted on the said shaft, a planetary pinion meshing with the orbit wheel and having a spindle mounted on the rotary element, a plurality of planetary pinions carried by the spindle, a clutch supported by the spindle, having means for connecting the pinions with the first mentioned pinion, an operating member arranged within the hollow shaft, means for connecting the operating member with the clutch, a piston connected to the operating member, a rotary cylinder having a cam engaging the piston and adapted to actuate the operating member, and gearing for rotating the cylinder, said gearing being provided with a slidable rack.

8. Planetary gearing comprising a hollow driving shaft, spaced stationary orbit wheels arranged on the shaft, a rotary element mounted on the shaft and located between the orbit wheels, planetary pinions meshing with the orbit wheels, means for connecting the said pinions and for mounting the same on the rotary element, spaced loose planetary pinions mounted on the said connecting means, clutches operating between the loose pinions for connecting the same with the first mentioned pinion, operating members arranged within the hollow shaft and connected with the clutches and mechanism for actuating the clutch operating members, including pistons, rotary cylinders receiving the pistons and having cams for engaging the same to actuate the operating members, and means for rotating the cylinders.

9. Planetary gearing comprising a hollow driving shaft, spaced stationary orbit wheels, arranged on the shaft, a rotary element mounted on the shaft and located between the orbit wheels, planetary pinions meshing with the orbit wheels, means for connecting the said pinions and for mounting the same on the rotary element, spaced loose planetary pinions mounted on the said connecting means, clutches operating between the loose pinions for connecting the same with the first mentioned pinion, operating members arranged within the hollow shaft and connected with the clutches, and mechanism for actuating the clutch operating members, including pistons, rotary cylinders receiving the pistons and having cams for engaging the same to actuate the operating members, and gearing for rotating the cylinders, having pinions and provided with slidable racks meshing with the pinions at diametrically opposite points.

In testimony whereof I have signed my name to this specificaiton.

EMILE JOHN WELFFENS.